United States Patent [19]

Brown

[11] Patent Number: 4,712,436

[45] Date of Patent: Dec. 15, 1987

[54] BALANCERS FOR VARIOUS RECIPROCATING MACHINES USING ROTATING BALANCE WEIGHTS

[76] Inventor: Arthur E. Brown, R.D. #1, Box 1107, Lake George, N.Y. 12845

[21] Appl. No.: 782,893

[22] Filed: Oct. 2, 1985

[51] Int. Cl.$^4$ .............................................. F16F 15/26
[52] U.S. Cl. .......................................... 74/44; 74/603; 123/192 B
[58] Field of Search ............... 74/44, 591, 590, 589, 74/603, 604; 123/192 B, 55 R

[56] References Cited

U.S. PATENT DOCUMENTS

| | | | |
|---|---|---|---|
| 1,163,832 | 12/1915 | Lanchester | 123/55 R |
| 1,205,895 | 11/1916 | Hoyt | 123/192 B |
| 1,898,459 | 2/1933 | Newcomb | 123/192 B |
| 2,963,854 | 12/1960 | Meijer | 74/44 |
| 3,109,417 | 11/1963 | Bekkala et al. | 123/192 B |
| 3,402,707 | 9/1968 | Heron | 74/604 |
| 3,415,237 | 12/1968 | Harkman | 74/604 |
| 3,763,716 | 10/1973 | Blomberg | 123/192 B |
| 4,290,395 | 9/1981 | Sakano et al. | 123/192 B |
| 4,545,341 | 10/1985 | Corey et al. | 74/604 |

FOREIGN PATENT DOCUMENTS

| | | | |
|---|---|---|---|
| 636227 | 2/1962 | Canada | 123/192 B |
| 637117 | 2/1962 | Canada | 123/192 B |
| 217244 | 2/1901 | Fed. Rep. of Germany | 123/192 B |
| 1426086 | 12/1960 | Fed. Rep. of Germany | 123/192 B |
| 1196012 | 7/1965 | Fed. Rep. of Germany | 123/192 B |
| 2757332 | 5/1979 | Fed. Rep. of Germany | 123/192 B |
| 844071 | 10/1962 | United Kingdom | 123/192 B |
| 1210249 | 10/1970 | United Kingdom | 123/192 B |

*Primary Examiner*—Dave W. Arola

[57] ABSTRACT

A rotary crankshaft has multiple cranks. Each crank drives a reciprocating member in a cylinder or guideway via a con rod. Main counterweights are attached to the crankshaft and rotate therewith. Two contraweights rotate in the opposite direction from the crankshaft and at the same RPM as the crankshaft. The two contraweights are generally rotatably mounted on the crankshaft, coaxial therewith, and near each end of the crankshaft. The two contraweights are driven from the crankshaft by toothed gearing. The two contraweights plus the main counterweights combine forces so as to counterbalance the primary reciprocating inertia forces of a *plurality* of said reciprocating members.

By proper adjustment of the size and angular location of both the main counterweights and the two contraweights, it is possible to obtain near perfect primary balance under any or all of the following conditions:

(a) Any number of cranks.
(b) Non equal reciprocating weights.
(c) Non equal crank throws.
(d) Non equal angular spacing of cranks and most any crank angle sequence.
(e) Non equal axial spacing of cranks along the length of the crankshaft.
(f) Cylinders may radiate outward at odd angles from the crankshaft.

In all of the above cases (a) to (f), this invention teaches how to provide near perfect *primary* balance using only two contraweights. Lanchester weights are sometimes used at each end of the crankshaft so as to balance the secondary reciprocating inertia forces. The same gearing which drives the Lanchester weights is also also used to assist in driving said contraweights so as to minimize the total number of shafts, bearings, and gears and also to eliminate the need of countershafts running the full length of the crankshaft.

8 Claims, 13 Drawing Figures

BALANCERS FOR VARIOUS RECIPROCATING MACHINES USING ROTATING BALANCE WEIGHTS

INTRODUCTION

This invention is related of my earlier invention shown in application Ser. No. 468,139 (now U.S. Pat. No. 4,509,378).

There are many multi crank recip machines which have unbalanced shaking forces. An excellent tabulated reference on this is shown in the text "The Internal Combustion Engine in Theory and Practice, Volume II" by C. F. Taylor on pages 298 to 305. In referring to that reference, it is of particular interest to note that the arrangement to have no unbalanced primary or secondary shaking forces and with the smallest number of cylinders or cranks is the in-line six. Even this requires a specific crank sequence, equal recip weights, etc. Thus, there are many multi-crank multicylinder machines which prior to my invention have unbalanced shaking forces.

DISCUSSION OF PRIOR ART

A CONTRAWEIGHT is hereby defined as a balance weight which rotates in the opposite direction to that of a crankshaft and at the same RPM as the crankshaft and on an axis which is substantially coaxial with that of the crankshaft.

The term "CONTRAWEIGHT" may possibly have been coined by me as I have not seen the term before. However, it is a very fitting name as "contra" means opposite., i.e. contra rotating propellers, etc. The following patents show contraweights: U.S. Pat. Nos. 2,428,924 Albertson, 2,595,464 Kaufmann, German No. 1426086 Schmuck, U.S. Pat. No. 4,509,378 Brown.

All of the above patents show only single crank machines and there is no teaching as to how *only two contraweights* can be made to counterbalance the primary recip inertia forces of more than one piston in a multi crank multicylinder multipiston machine.

The following patents show balance weights driven from each end of a crankshaft by the crankshaft itself and without the need of countershafts running the full length of a multicrank crankshaft: U.S. Pat. No. 2,182,988 Iseler, German No. 2757332 Kusnacht.

The following patents show *pairs* of primary balance weights with one *pair* located near each end of a crankshaft: U.S. Pat. Nos. 1,898,959 Newcomb, 2,182,988 Iseler, 2,280,384 Dickson, 3,110,195 Hanley.

None of these patents show contraweights because in each case, the pair of primary balance weights are mounted on countershafts offset from the axis of the crankshaft. Thus, each of those prior art references are more complex than that of my invention which does not require countershafts for the *primary* weights and uses only one primary weight (not two) at each end of the crankshaft.

Figure 10:
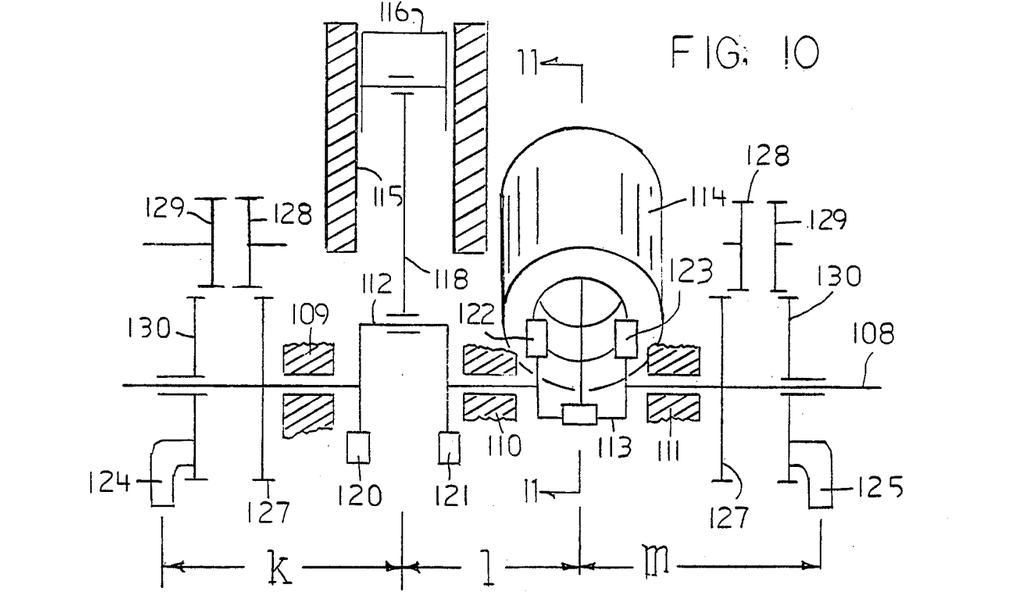
FIG. 10 (a fourth species) is a schematic single line drawing of a very general case wherein:
(a) The two cranks are unequally spaced.
(b) The two cylinders radiate out from the crankshaft at any odd angle.
(c) The recip weights are not equal.
(d) The crank throws are not equal.
Figure 11:
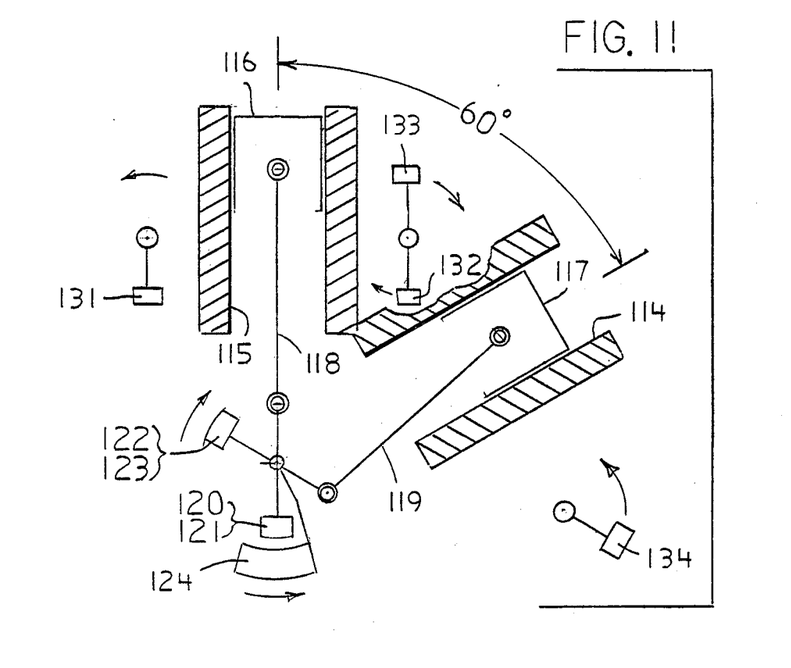
FIG. 11 is an end view of FIG. 10 taken along the lines 11—11 in FIG. 10.

Iseler shows two primary weights 55 and 55 at one end of his crankshaft (FIG. 6) plus a second similar pair at the other end of his crankshaft (FIG. 9). This balances the primary forces of his center bank of pistons C but in the process he removes the portion C from the main counterweights as shown in his FIG. 7. Referring to FIG. 7 of Iseler, the portion a' balances the rotary weights and the portion b' balances the primary recip forces of the *left* and *right* banks (page 3 right column, lines 32 to 40 of Iseler). Thus, the center bank of Iseler is totally dependent on the weights 55 (in FIGS. 6 and 9) for primary balance. This means therefore that the inertia force of each individual piston is imposed directly on the main bearings of the crankshaft instead of being opposed one half at the source (as applicant does). Also, the weights 55 of Iseler must be heavier than the contraweights of the applicant. Further, the primary weights 55 and 55 of Iseler will work only if the centerlines of all the cylinders lie in a common plane (as the case with the center bank of Iseler). In my invention, the contraweights are capable of balancing pistons in cylinders whose axes do not lie in a common plane (as shown in FIGS. 10 and 11 herein).

Iseler taught the use of both primary and secondary balance weights at both ends of a crankshaft. Iseler showed no contraweights at all and therefore Iseler did not teach how to drive contraweights at each end of a crankshaft using Lanchester shafts and Lanchester gearing to assist in driving the contraweights.

Lanchester in U.S. Pat. No. 1,163,832 taught the basic idea of driving a pair of balance weights at twice crankshaft speed so as to counterbalance secondary recip inertia forces due to a con rod of finite length.

OBJECTS AND ADVANTAGES OF THIS INVENTION

1. The first object is to provide primary balancing for those multi crank recip machines which do not have primary balancing on their own. This would include machines having two, three, and five cranks or more and sometimes four and six.

2. A second object is to provide such primary balancing in a simple manner wherein only two contraweights serve multiple cranks.

3. A third object is to provide primary balancing in a multi crank recip machine characterized as follows:
   (a) The machines could have any number of cranks from two to many cranks.
   (b) It is not necessary for each crank to drive equal recip weights or have equal throws.
   (c) It is not necessary that the cranks be equally spaced along the length of the crankshaft.
   (d) It is not necessary that the cranks be equally spaced angularly about the axis of the crankshaft or have any particular angular relation of one crank to another.
   (e) The center lines of the various cylinders do not have to all be in one common plane but instead may radiate out from the crankshaft at odd angles.

In all of the above cases (a) to (e), or any combination thereof, this invention teaches how to provide near perfect primary balance.

4. Another object is to also provide secondary balancing and use the same shafts and gearing for same to also assist in driving the contraweights so as to minimize the total number of shafts, bearings, and gears.

5. Another object is to drive a countraweight at each end of the crankshaft without the need of one or more countershafts running the full length of the crankshaft.

6. Another object is to mount the contraweights and the drive gears on the crankshaft in such a way that rigidity and squareness is assured, yet, a minimum of axial space is taken up.

7. An advantage of this invention is that the gears do not have to be so big in diameter compared to those shown in my earlier U.S. Pat. No. 4,509,378.

BRIEF DESCRIPTION OF THE DRAWINGS

FIG. 2 is a transverse cross section view of FIG. 1 taken along the lines 2—2 in FIG. 1. FIG. 2 is to a larger scale.

Figure 1:
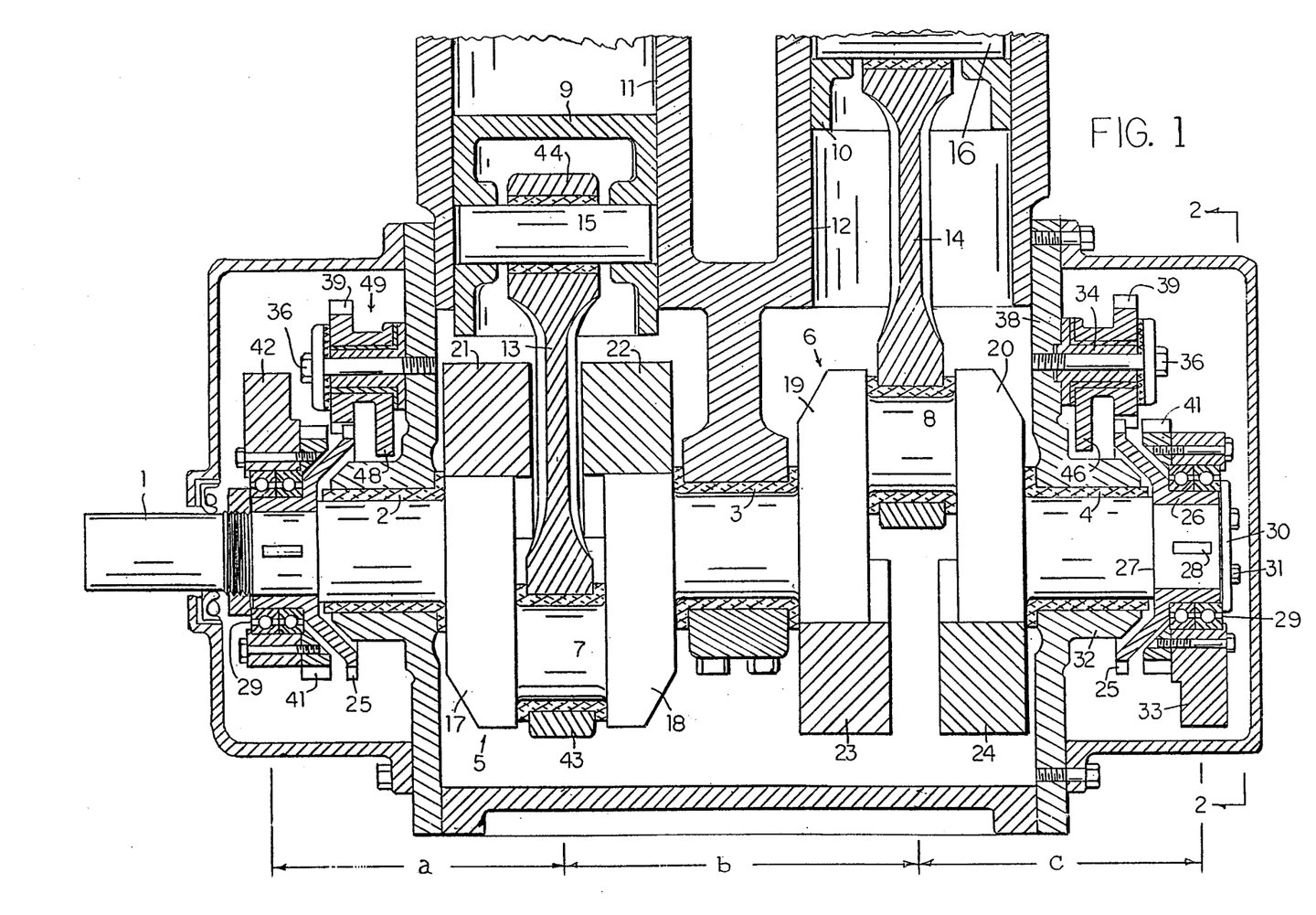
FIG. 1 is a section view of a two crank in-line recip machine.
Figure 2:
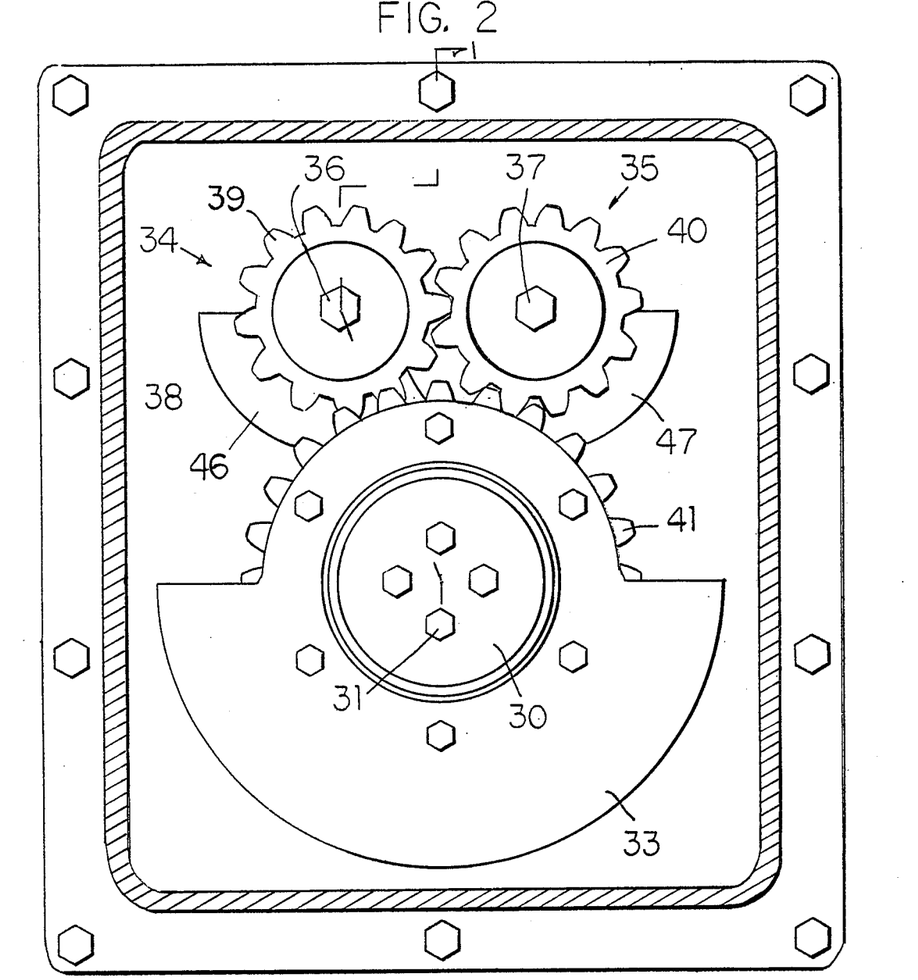
Figure 3:
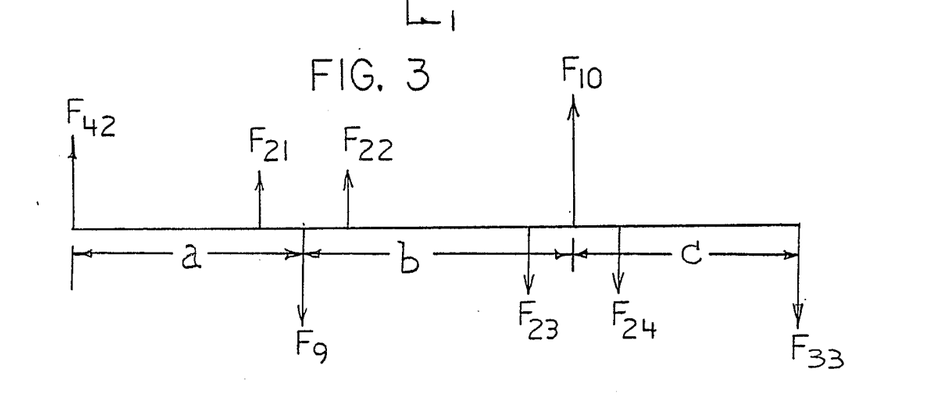
FIG. 3 is a force diagram illustrating the distribution of force along the length of the crankshaft in FIG. 1.

DETAILED DESCRIPTION OF FIGS. 1, 2 AND 3

This is a two crank machine wherein the two cranks are angularly spaced 180 degrees apart from each other and the two cylinders lie in a common plane; and the axis of the crankshaft lies in the same common plane. It is not necessary to have equal recip weights or equal throws of the two cranks and the balancing formulas derived will allow for such variations.

The crankshaft 1 is supported for rotation on main bearings 2, 3, and 4. There are two crank throws 5 and 6 each having crank pins 7 and 8. The recip pistons 9 and 10 are guided for reciprocation in their cylinders 11 and 12. Con rods 13 and 14 interconnect the crank pins 7 and 8 to wrist pins 15 and 16 for respective rotary and reciprocative motion. Attached to each crank arm 17, 18, 19, and 20 are main counterweights 21, 22, 23, and 24. The gear 25 has a sleeve 26 formed as part of its hub. The sleeve is pressed onto the crankshaft up against shoulder 27 and keyed 28. The ball bearings 29 fit tightly over the sleeve. The cap plate 30 and bolts 31 hold the ball bearings 29 and sleeve 26 tightly against the shaft shoulder 27. Thus, both the gear 25 and the ball bearings 29 are held tightly in place and square with the crankshaft. The gear 25 is made bell shape and it thus overhangs the boss 32 of the main bearing (so as to save axial space). It is possible to make the gear 25 overhanging since it is so rigidly and squarely fastened to the crankshaft. This arrangement leads to compactness of the whole machine (particularly in the axial direction). The contraweight 33 is adapted to rotate at the same RPM as the crankshaft but in the opposite direction to that of the crankshaft and the two ball bearings 29 support the contraweight for such contra rotation.

Two stub shafts 34 and 35 are bolted by 36 and 37 to the end wall of the crankcase 38. Each stub shaft supports for rotation a pinion gear 39 and 40. The first pinion gear 39 is one half the size of larger gear 25 and meshes with same. The first pinion gear 39 is double wide and also meshes (in a separate axially spaced plane) with an equal diameter second pinion gear 40. The second pinion gear 40 is also double wide and meshes (in a third axially spaced plane) with a twice size second larger gear 41. The ring gear 41 is bolted to the contraweight 33 and rotates therewith. It is thus seen that the contraweight 33 is driven at the same RPM as the crankshaft but in the opposite direction of rotation. Identical gears, stub shafts, and a second contraweight 42 are located at the other end of the crankshaft.

Refer to my earlier U.S. Pat. No. 4,509,378. The basic principles of balancing both primary and secondary recip inertia forces in a *single* crank machine are shown in FIGS. 3 to 8 of that earlier patent and thus there is no need to repeat those figures or that explanation here. The balancing in the multi-crank machine herein is similar to that of the single crank machine (shown in U.S. Pat. No. 4,509,378) except that only two contraweights are made to serve multiple cranks as will subsequently be explained.

The main counterweights 21 and 22 should be designed so as to counterbalance the rotating parts consisting of crank arms 17 and 18, crank pin 7, and large end 43 of con rod 13. In addition, the main counterweights 21 and 22 are designed to counterbalance *one half* of [the static moment of piston 9, its wrist pin 15, and the small end 44 of con rod 13]. The term "static moment" here means weight of the respective parts (LBS. or grams) multiplied by the "throw" (inches or metric) of crank 5. The throw is the crank radius and equals stroke/2. The same applies to main counterweights 23 and 24 where they counterbalance their respective parts (both rotating and recip) in the same manner.

The distance "a" is the distance (measured parallel to the crankshaft) between the center width of contraweight 42 and the center of piston 9. The distance "b" is the distance between the centers of pistons 9 and 10. The distance "c" is from the center of piston 10 to the center width of contraweight 33.

The formula for primary balance in FIG. 1 will next be derived: and the moments will be marked on FIG. 3. Let $F_9$=static moment of piston 9, wrist pin 15, and the small end 44 of con rod 13. This, is the weight of those parts times the throw of crank 5.

$F_{10}$=same but for piston 10 and its respective parts.

$F_{21}$, $F_{22}$, $F_{23}$, and $F_{24}$ are main counterweight moments.

$F_{42}$ and $F_{33}$=static moments of respective contraweights 42 and 33.

The above static moments could be considered the same as forces since recip primary force and centrifugal force are directly proportional to static moment. Thus the forces $F_9$, $F_{10}$, $F_{42}$, and $F_{33}$ are represented in FIG. 3 as they act along the length of the crankshaft. The forces $F_9$ and $F_{10}$ are each divided by two since one half of each is opposed by the main counterweights in each case.

Taking vertical moments about contraweight 42 (in FIG. 3):

$$aF_9/2+(a+b+c)F_{33}=(a+b)F_{10}/2$$

Next equate forces upward to those downward and:

$$F_{42}+F_{10}/2=F_9/2+F_{33}$$

Solving the above two equations:

$$F_{42} = \frac{(a+b)F_{10}-aF_9}{2(a+b+c)} + \frac{F_9}{2} - \frac{F_{10}}{2} \text{ and}$$

$$F_{33} = F_{42} + \frac{F_{10}}{2} - \frac{F_9}{2}$$

The teaching thus far shows how to obtain primary balance in a simple two crank in-line machine. Thus, primary balancing of the two pistons 9 and 10 are obtained using only the two contraweights 33 and 42 and one piston can be heavier than the other and the spacing "a" and "c" can be non equal (by proportioning the weights 33 and 42 accoring to the formulas).

Secondary balancing in FIGS. 1 and 2 will next be described. Lanchester weights 46 and 47 are fastened to the pinion gears 39 and 40 and thus the Lanchester weights are driven at twice crankshaft speed so as to counterbalance the secondary recip inertia forces. The weights 46 and 47 (as shown in FIGS. 1 and 2) are directed downward which is their correct orientation for balancing with the piston 9 at bottom dead center and piston 10 at top dead center as shown in FIG. 1. The Lanchester weights 48 and 49 in the other end of the machine are also directed downward which is their correct orientation also. The piston 9 is at bottom dead center and its secondary recip inertia force is *upward*. Thus, the downward directed weights 48 and 49 are correctly oriented. The piston 10 is at top dead center and its secondary recip inertia force is also upward. Thus, the downward directed weights 46 and 47 are correctly oriented. Thus, for the particular crank arrangement shown in FIG. 1, the two pairs of Lanchester weights have the same phasing. Such will not be the case for more complex crank arrangements such as shown in the following cases.

DETAILED DESCRIPTION OF FIGS. 4 TO 7

Figures 4, 5, 6, 7:
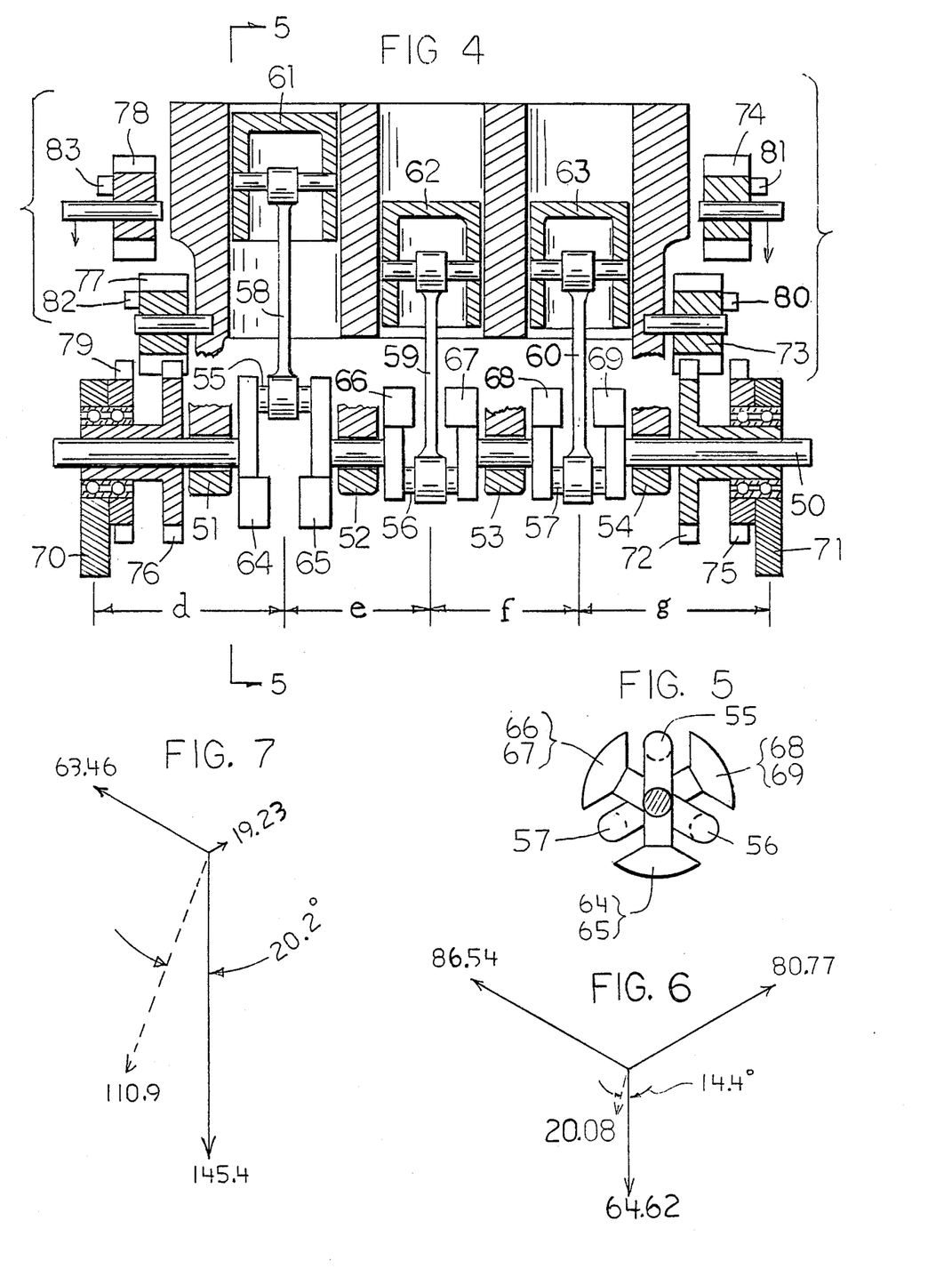
FIG. 4 (a second species of this invention) shows a three crank in-line machine having no unbalanced primarys, secondarys, or couples.
FIG. 5 is an end view in FIG. 4 showing just the crankshaft and main counterweights. The section is taken along lines 5—5 in FIG. 4.
FIGS. 6 and 7 illustrate vector moments in a numerical example of how to balance FIG. 4.

The next case (of increasing complexity) illustrates a three crank three cylinder recip machine in which the axis of the three cylinders all lie in a common plane and the axis of the crankshaft lies in the same common plane.

Referring to FIG. 4, the crankshaft 50 is mounted for rotation on main bearings 51, 52, 53, and 54. There are three crank throws with crank pins 55, 56, and 57. Con rods 58, 59, and 60 are journaled to their respective crank pins. Each con rod drives a respective recip piston; 61, 62, and 63 with wrist pins inside each piston.

The main counterweights 64 to 69 are attached to the crankshaft and rotate therewith.

The two contraweights 70 and 71 are journaled to each end of the crankshaft. The dimensions between piston centerlines and the contraweights are d, e, f, and g as marked. The three cranks are equally spaced 120 degrees apart.

The larger gear 72 is fastened to the crankshaft and rotates therewith. The half size pinion gear 73 meshes with gear 72 and also with pinion gear 74 in a separate axially spaced plane. Gears 73 and 74 are mounted on stub shafts. Gear 73 also meshes with gear 75 so as to drive contraweight 71 at crankshaft speed but in the opposite direction. A similar set of gears 76 to 79 are located on the other end of the crankshaft so as to drive countraweight 70. In FIG. 4, the gears 74 and 78 are shown as an exploded view so as to be more clearly shown. The assembled positions of gears 74 and 78 are to be behind gears 73 and 77 and at the same height (similar to gears 39 and 40 in FIG. 2).

The method of balancing the *primary* inertia forces in FIGS. 4 and 5 is described as follows (steps 1 to 12):

STEP 1: Rotate the crankshaft such that piston 61 and crank 55 are at the top dead center position—as shown in FIGS. 4 and 5.

STEP 2: Adjust the static momment of main counterweights 64 and 65 such that they counterbalance all of the rotating portions of crank 55 plus the large end of con rod 58.

STEP 3: Add additional static momment to the main counterweights 64 and 65 such that they counterbalance *one half* the static momment of piston 61 plus *one half* the static moment of the small end of con rod 58. The static moment of piston; 61 is the total weight of piston 61 (including rings and wrist pin) multiplied by the throw (radius arm) of crank 55. The direction of counterweights 64 and 65 will be diametrically opposite the crank pin 55 for both steps 2 and 3

STEP 4: Adjust the static moment of contraweights 70 and 71 such that they counterbalance the remaining half of the static moment of piston 61 and the small end of con rod 58. The apportionment of the static moment shared by contraweights 70 and 71 will be in inverse proportion to their distances (along the crankshaft) from the centerline of piston 61. That is, the static moment balanced by contraweight 70 will be $(e+f+g)/(d+e+g+g)$ times (one half the static moment of piston 61 plus one half the static moment of the small end of con rod 58). The remainder will be balanced by contraweight 71. The vector moments just determined (for contraweights 70 and 71) will be straight down in the opposite direction away from piston 61.

STEP 5: This step has to do with balancing the next piston 62. Therefore, rotate the crankshaft 50 (counterclockwise when viewed from the left end of the crankshaft) such that the piston 62 is moved to its top dead center position. At the same time, rotate the contraweights 70 and 71 the same number of degrees (clockwise when viewed from the left end of the crankshaft) in the *opposite* direction of rotation to that of the crankshaft. The moment vectors determined in Step 4 (for the contraweights 70 and 71) will now be pointed in new directions as just specified.

STEP 6: Do the same as steps 2 and 3 for main counterweights 66 and 67 and their respective parts 56, 62, and 59.

STEP 7: Add additional moments to contraweights 70 and 71 such that they counterbalance the remaining half of the static moment of piston; 62 and the small end of con rod 59. Apportion in the same manner as described in Step 4. That is, the static moment balanced by contraweight 70 will be $(f+g)/(d+e+f+g)$ times (one half the static moment of piston 62 plus one half the static moment of the small end of con rod 59). The remainder will be balanced by contraweight 71. The vector moments just determined (for contraweights 70 and 71) will be in the opposite direction away from piston; 62.

STEP 8: This step has to do with balancing the final piston 63. Therefore, rotate the crankshaft 50 (again counterclockwise) such that the piston 63 is moved to its top dead center position. AT the same time, rotate the contraweights 70 and 71 the same number of degrees in the *opposite* direction of rotation to that of the crankshaft. The moment vectors determined in Steps 4 and 7 will now be pointed in new directions as just specified.

STEP 9: Do the same as steps 2 and 3 for main counterweights 68 and 69 and their respective parts 57, 60, and 63.

STEP 10: Add additional moments to contraweights 70 and 71 such that they counterbalance the remaining half of the static moment of piston 63 and the small end of con rod 60. Apportion in the same manner as described in Step 4 using appropriate distance along the crankshaft.

STEP 11: The contraweight 70 now has three moment vectors as determined in Steps 4, 7, and 10. One moment vector is due to balancing piston 61, the second moment vector is due to balancing piston 62, and the third moment vector is due to balancing piston 63. This Step 11 is to find the vector sum of those three moment vectors and this will be the resultant static moment and direction of contraweight 70.

STEP 12: Do the same as Step 11 for contraweight 71.

These steps 1 to 12 describe how to secure *primary* balance. The matter of secondary balance will be described subsequently.

It would be possible to derive a general equation for balancing FIGS. 4 and 5 using letters for distances and letters for static moments. However, such an equation would become complex and unwieldy. Therefore, the clearest and simplest method to show how to balance the three crank machine of FIG. 4 and 5 is to perform a calculation by numerical example. That is, assign weights and distances for the various parts and perform a balancing calculation using those numbers and by following the twelve step procedure just outlined.

Therefore referring to FIG. 4, assume the weight of piston 61 plus its wrist pin plus the small end of con rod 58 weighs 50 LBS. Assume the weight of piston 62 plus its wrist pin plus the small end of con rod 59 weighs 60 LBS. Assume the weight of piston 63 plus its wrist pin plus the small end of con rod 60 weighs 70 LBS.

Assume the throw or crank radius of crank 55 is 4 inches, crank 56 is 5 inches, and crank 57 is 6 inches.

Assume distances d, e, f, and g are 5 inches, 6 inches, 7 inches and 8 inches respectively.

Assume all three cranks are equally spaced 120 degrees from each other. The problem could be made a little more difficult by going to cranks with non equal angular spacing; but the solution method would be the same.

STEP 1: The piston 61 and crank 55 are already shown at the top dead center position in FIGS. 4 and 5.

STEP 2: The rotating portions are balanced in this step and will have no effect on the contraweights 70 and 71 so no calculations for Step 2 are needed here.

STEP 3: The static moment of piston 61 and the small end of con rod 58 is weight×crank throw=50 LBS×4 inches=200 LB inches. One half of this is 100 LB inches. So 100 LB inches will be added to the static moment of counterweights 64 and 65 (not each, but total).

STEP 4: The static moment balanced by contraweight 70 will be $(6+7+8)/(5+6+7+8) \times 100 = 80.77$ LB inches. The static moment balanced by contraweight 71 = $100 - 80.77 = 19.23$ LB inches. These are marked on FIGS. 6 and 7 respectively.

STEP 5: Rotate the parts as specified.

STEP 6: The static moment of piston 62 and the small end of con rod 59 is 60 LBS.×5 inches=300 LB inches. One half of this is 150 LB inches. So 150 LB inches will be added to the static moments of counterweights 66 and 67 (not each but total).

STEP 7: The static moment balanced by contraweight 70 will be $(7+8)/(5+6+7+8) \times 150 = 86.54$ LB inches. The static moment balanced by contraweight 71 is $150 - 86.54 = 63.46$ LB inches. These are marked on FIGS. 6 and 7 respectively.

STEP 8: Rotate the parts as specified.

STEP 9: The static moment of piston 63 and the small end of con rod 60 is 70 LBS.×6 inches=420 LB inches. One half of this is 210 LB inches. So add 210 LB inches to the static moments of counterweights 68 and 69 (not each but total).

STEP 10: The static moment balanced by contraweight 70 will be $8/(5+6+7+8) \times 210 = 64.62$ LB inches. The static moment balanced by contraweight 71 is $210 - 64.62 = 145.4$ LB inches. These are marked in FIGS. 7 and 7 respectively.

STEP 11: FIG. 6 shows (for contraweight 70) the three vectors determined in steps 4, 7, and 10. Further, FIG. 6 shows the three vectors rotated to their respective positions as specified in steps 1, 5, and 8. FIG. 6 shows the final position specified in step 8 with piston 63 at top dead center. Solving FIG. 6 vectorally, the net vertical force is $(86.54+80.77)/2 - 64.2 = 19.45$ LB inches downward; and the net horizontal force is $(86.54-80.77) \cos 30° = 5$ LB inches to the left. The vector sum of these is $\sqrt{19.45^2 + 5^2} = 20.08$ LB inches downward to the left at an angle of 14.4 degrees from the vertical (marked with dotted arrow in FIG. 6).

STEP 12: FIG. 7 shows (for contraweight 71) the three vectors determined in steps 4, 7, and 10. Solving these by the same method as Step 11, the resultant moment for contraweight 71 is 110.9 LB inches downward to the left at an angle of 20.2 degrees from the vertical (marked with dotted arrow).

The moments and resultants shown to scale in FIGS. 6 and 7 are when piston 63 is at top dead center and both viewed from the left end of FIG. 4. Keep in mind that the vectors shown in FIGS. 6 and 7 both rotated clockwise during this calculation procedure, i.e. The 80.77 vector was straight down in Steps 1 to 4 and then rotated clockwise 120 degrees in Step 5 and 120 degrees more in Step 8 to the final position shown in FIG. 6.

The previous calculations have thus determined the size and direction for contraweight 70 and 71 to obtain primary balance of all three pistons 61, 62, and 63 taking into account:

(a) The pistons have different weights.
(b) The crank throws are all different.
(c) The distances d, e, f, and g are all different.
(d) The crank angles were equally spaced 120 degrees apart.

They could have been different but the calculation would be similar.

Secondary forces in FIG. 4 are balanced as next described: Lanchester weights 80 to 83 are attached to pinion gears 73, 74, 77, and 78 so as to rotate at twice crankshaft speed. The static moments and orientation of the four Lanchester weights are determined by the same method described for the primary weights. That is, bring each piston one at a time to top dead center and calculate moments and orientation of the Lanchester weights, apportion the weights each time according to relative distances along the crankshaft, and then finally summarize vector moments in the same manner as was done in FIGS. 6 and 7. Keep in mind that the secondary force of each piston is the primary force divided by the ratio of con rod length to crank throw. Further, centrifugal force is proportional to RPM squared. Therefore divide each primary recip moment by the con rod length ratio; also divide by four since the Lanchester weights rotate at twice speed, and also divide by the number of Lanchester weights to arrive at the size of each Lanchester weight.

Figure 8:
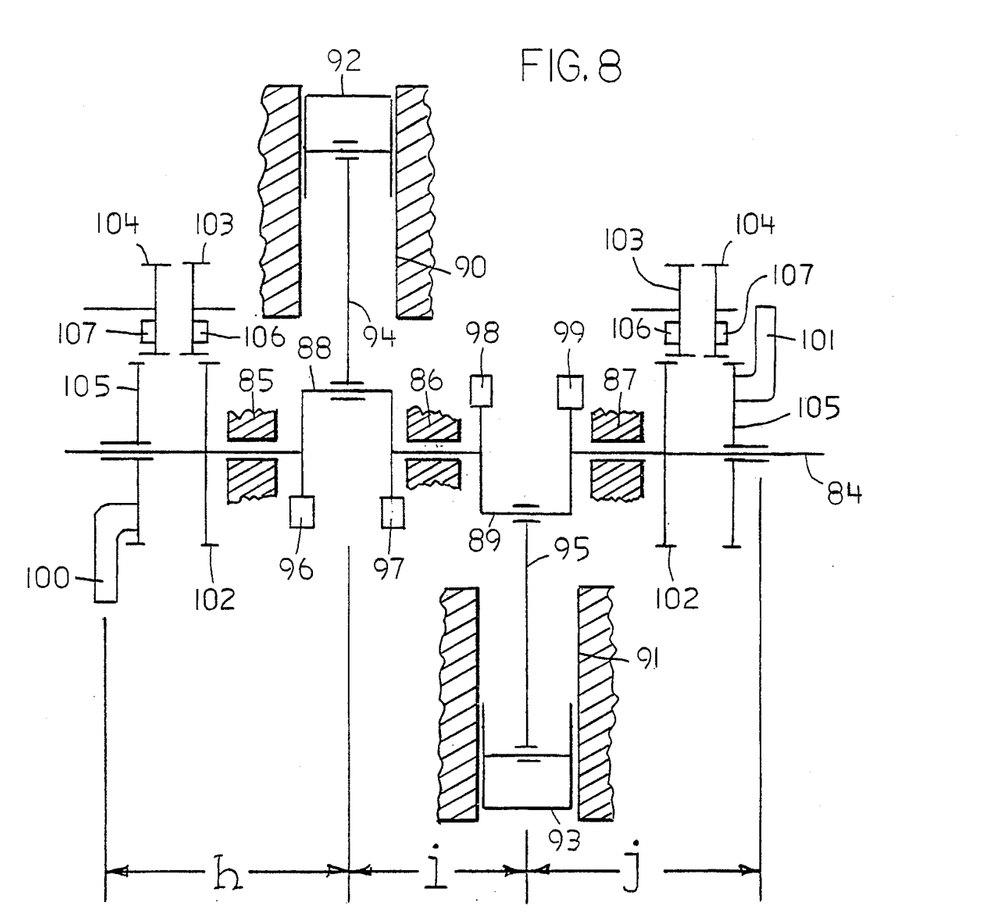
FIG. 8 (a third species) is a schematic single line drawing of a two crank machine with cylinders disposed at 180 degrees from each other. It also has no unbalanced primaries, secondaries, or couples.
Figure 9:
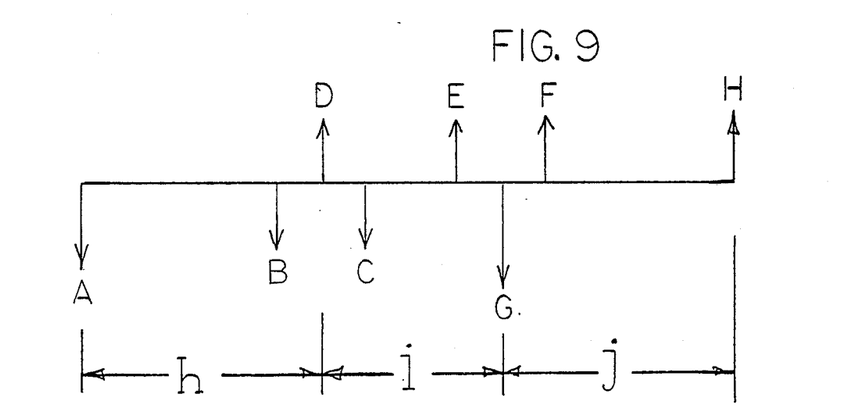
FIG. 9 is a force diagram showing primary inertia forces acting along the length of FIG. 8 and with complete primary balance.

DETAILED DESCRIPTION OF FIGS. 8 AND 9

A two throw crankshaft 84 is journaled for rotation in main bearings 85, 86, and 87. There are two crank throws 88 and 89 disposed 180 degrees apart from each other. The axes of the two cylinders 90 and 91 lie on opposite sides of the crankshaft in a common plane and the axis of the crankshaft 84 lies in the same common plane. Recip pistons 92 and 92 are located in their respective cylinders. Con rods 94 and 95 interconnect each crank pin with a respective piston using piston pins. Main counterweights 96 to 99 are fastened to the cranks and rotate therewith. Contraweights 100 and 101 are journaled to the crankshaft and are adapted to rotate in the opposite direction from that of the crankshaft and at the same RPM as the crankshaft by means of gears 102 to 105 similar to those shown in FIGS. 1 and 2. The distances h, i, and j are between contraweights and piston centerlines as shown.

For *primary* balance in FIG. 8, the following relationship should be held: The rotating parts including crank pin 88 and large end of con rod 94 are to be counterbalanced by the main counterweights 96 and 97. Same for parts 89, 95, 98, and 99. One half of the primary moment of piston 92 plus one half that of the small end of con rod 94 are to be counterbalanced by the main counterweights 96 and 97. Also, one half of the primary moment of piston 93 plus one half that of the small end of con rod 95 are to be counterbalanced by the main counterweight 98 and 99. The remaining halves of the primary moments of the recip parts are to be balanced by the two contraweights 100 and 101.

The two pistons 92 and 93 have a centerline spacing "i" as shown in FIG. 8 whereas the spacing of the two contraweights 100 and 101 have a larger spacing h+i+j and therefore the weights of the contraweights 100 and 101 can be reduced accordingly.

The static moments of contraweight 100 and 101 multiplied by their center distance (h+i+j) should be set equal to one half the recip primary moments multiplied by their center distance i. The other half of the recip primary moments will be balanced by the main counterweights 96, 97, 98, and 99. The balancing described in this paragraph is illustrated in FIG. 9, where: Force A is the centrifugal force or moment of contraweight 100. Forces B and C are the centrifugal forces or moments of main counterweights 96 and 97. The moments B and C do not include those forces for balancing *rotating* parts. The force D is the *primary* recip inertia force (or moment) of piston 92 and the small end of con rod 94. The forces E and F are from weights 98 and 99. The force G is the *primary* recip inertia force of piston 93 and the small end of con rod 95. The force H is the centrifugal force of contraweight 101.

Referring still to FIG. 9, the forces B+C are set equal to one half of D. The forces E+F are set equal to one half of G. For primary balance, the following relationship should be held:

$$D/2 \times h - G/2 \times (h+i) = H \times (h+i+j).$$

Also:

$$D/2 + H = A + G/2$$

Solving the above two equations:

$$A = \frac{Dh - G(h+i)}{2(h+i+j)} + \frac{D-G}{2}$$

Thus primary balancing in FIG. 8 is accomplished whether or not the two recip weights are equal and whether or not the two cranks 88 and 89 have equal throw, and whether or not the distance h is equal to distance j.

Secondary balancing is accomplished by mounting Lanchester weights 106 and 107 on the gears 103 and 104 which rotate at twice crankshaft speed.

DETAILED DESCRIPTION OF FIGS. 10 and 11

(a) There are two crank throws, two con rods, and two recip pistons.
(b) One piston is heavier than the other.
(c) One crank throw is larger than the other.
(d) The two cranks are disposed at an odd angle (120 degrees) between each other.
(e) The two cylinders do not lie in a common plane but instead are disposed at an odd angle (60 degrees) relative to each other.
(f) One contraweight is located farther from its nearest crank than the other contraweight is located from the second crank. Thus FIGS. 10 and 11 illustrate a most general case.

A crankshaft 108 is journaled for rotation on main bearings 109, 110 and 111. The crankshaft has two crank throws with crank pins 112 and 113 disposed at 120 degrees from each other. The cylinder 114 is disposed at a 60 degree angle (out from the crankshaft) relative to cylinder 115. Recip pistons 116 and 117 are located in their respective cylinders. Con rods 118 and 119 interconnect the respective crank pins to the pistons via wrist pins. Main counterweights 120, 121, 122 and 123 are attached to the crankshaft and rotate therewith. Contraweights 124 and 125 are journaled for rotation on each end of the crankshaft and these are both adapted to rotate in the opposite direction from that of the crankshaft but at the same RPM as the crankshaft (driven by gearing 127 to 130 similar to FIG. 1 gearing). The distances k, l, and m indicate distances between the center lines of the contraweights and the pistons as shown.

To obtain primary balancing for FIGS. 10 and 11, follow the same twelve step procedure outlined for FIGS. 4 and 5.

The secondary weights 131 to 134 rotate at twice crankshaft speed so as to balance the secondary forces. The weights 131 and 132 balance piston 116. The weights 133 and 134 balance piston 117. The weights 132 and 133 are on the same shaft but axially spaced to account for the distance l between piston centerlines. The secondary weights 131 to 134 are driven by separate gearing not shown.

Thus, both primary and secondary balancing is provided for the most general case shown in FIGS. 10 and 11.

Figure 12:
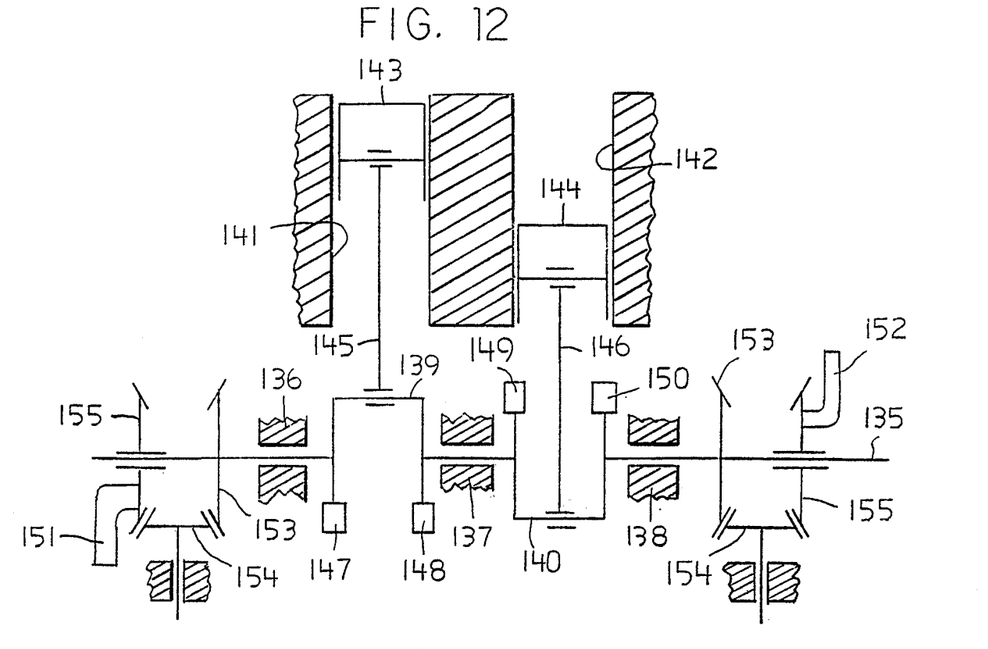
FIGS. 12 and 13 are schematic single line drawings of two cylinder machines using different gear drives from that of FIG. 1.

DETAILED DESCRIPTION OF FIG. 12

The various parts are: crankshaft 135, main bearings 136, 137, 138, crank throws 139, 140, cylinders 141, 142, pistons 143, 144, con rods 145, 146, main counterweights 147 to 150 and contraweights 151, 152. In this case the contraweight 151 is driven in the opposite direction to the crankshaft and at the same RPM as the crankshaft by means of three bevel gears 153, 154, and 155. The second contraweight 152 is driven by a second set of bevel gears. FIG. 12 has primary balance only and no secondary balancing.

Figure 13:
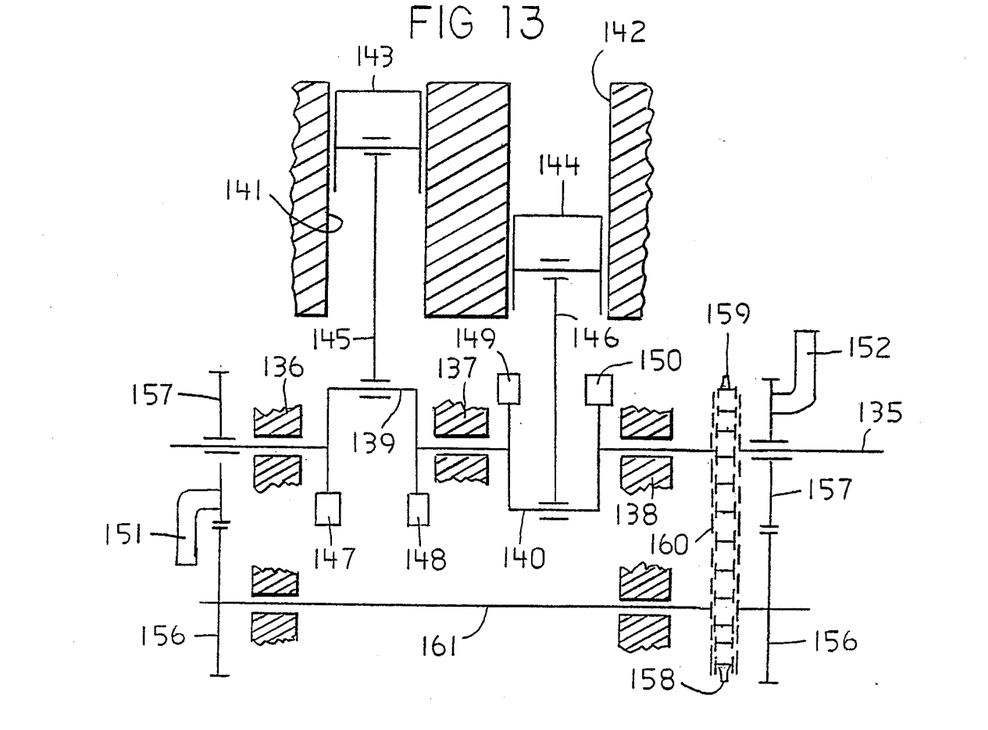

DETAILED DESCRIPTION OF FIG. 13

This is similar to FIG. 12 except the contraweights are driven by four equal size gears 156, 156, 157, 157, two equal size sprockets 158, 159, chain 160, and long countershaft 161.

MODIFICATION NOT SHOWN

Referring to FIGS. 1 and 2, the pinion gear 39 is double wide and meshes in one plane with gear 25 and in a separate axially spaced plane with gear 40. It would be possible to instead make the gear 39 as two separate pinion gears fastened together. Such a construction is to be regarded as a single pinion gear as far as the claims are concerned.

While the preferred embodiments of the invention have been disclosed, it will be understood that the invention is not limited thereto since it may be otherwise embodied within the scope of the following claims:

I claim:

1. In a reciprocating machine, the combination of a frame structure, a crankshaft mounted for rotation in said frame structure, said crankshaft having at least one crank, at least one reciprocable member guided for reciprocation, a connecting rod interconnecting said crank and said reciprocable member for respective rotary and reciprocable motion, at least one main counterweight attached to said crankshaft and rotatable therewith, two contraweights mounted for rotation around the axis of said crankshaft, said contraweights being adapted to rotate in the opposite direction to that of said crankshaft and at the same RPM as the crankshaft, said contraweights in cooperation with said main counterweight serving to counterbalance the primary reciprocating inertia forces of said reciprocable member, and wherein the improvement comprises, two stub shafts, attached to one end of said frame structure, two more stub shafts attached to the other end of said frame structure making at least four stub shafts total, a secondary balance weight mounted for rotation on each of said stub shafts making at least four secondary balance weights total, pinion gears mounted for rotation on said four stub shafts making at least four such pinion gears total, two larger gears attached to said crankshaft and rotatable therewith, two more larger gears attached one to each of said contraweights making at least four larger gears total, said pinion gears and said larger gears (at one end of the frame structure) meshing so as to drive two of said secondary balance weights at twice crankshaft speed and so as to drive one of said contraweights, the remaining said pinion gears and the remaining said larger gears (at the other end of the frame structure) meshing so as to drive the remaining two secondary balance weights at twice crankshaft speed and so as to drive the other said contraweight, and said four secondary balance weights serving to counterbalance the secondary reciprocating inertia force of said reciprocable member.

2. The combination specified in claim 1 wherein said crankshaft has a plurality of said cranks and said machine has a plurality of said reciprocable members and a plurality of said connecting rods, and wherein the two said contraweights in cooperation with at least one said main counterweight serve to counterbalance said plurality of reciprocable members, and wherein said four secondary balance weights serve to counterbalance the secondary reciprocating inertia forces of said plurality of reciprocable members.

3. In a reciprocating machine, the combination of a frame structure, a crankshaft mounted for rotation in the frame structure, said crankshaft having at least one crank, at least one reciprocable member guided for reciprocation relative to said frame structure, a connecting rod interconnecting each reciprocable member with a respective said crank for respective reciprocative and rotary motion, main counterweights fastened to said crankshaft and rotatable therewith, two contraweights mounted for rotation around the axis of said crankshaft, positive tooth driving means for driving said contraweights at the same RPM as the crankshaft and in the opposite direction of rotation to that of the crankshaft, said contraweights in cooperation with said main counterweights serving to counterbalance the primary reciprocating inertia force of at least one said reciprocable member, and wherein the improvement comprises: said machine is further defined as having a plurality of reciprocable members, said crankshaft is further defined as having a plurality of cranks, at least two of said cranks being angularly disposed relative to each other about the axis of the crankshaft, said two contraweights being angularly disposed (in their directions of force) about the axis of the crankshaft, said two contraweights being mounted one on opposite sides of at least two angularly offset cranks with the cranks located between the two said contraweights, and said two contraweights in cooperation with said main counterweights serving to counterbalance the primary reciprocating inertia forces of at least two of said reciprocable members.

4. The combination specified in claim 3 wherein said positive tooth driving means contains eight gears described as follows: a first gear is fastened to the crankshaft and rotates therewith, second gear mounted for rotation on an offset shaft, said second gear meshes with said first gear and is driven thereby, third gear mounted for rotation on a second offset shaft, said third gear meshes with said second gear and is driven thereby, a fourth gear is attached to one of said contraweights and rotates therewith, said fourth gear meshes with said third gear and is driven thereby, said fourth gear drives its respective contraweight at the same RPM as said crankshaft but in the opposite direction to that of the crankshaft, a fifth gear is fastened to said crankshaft and rotates therewith, sixth gear mounted for rotation on a third offset shaft, said sixth gear meshes with said fifth gear and is driven thereby, seventh gear mounted for rotation on a fourth offset shaft, said seventh gear meshes with said sixth gear and is driven thereby, an eighth gear is attached to the second said contraweight and rotates therewith, said eighth gear meshes with said seventh gear and is driven thereby, and said eighth gear drives its respective contraweight at the same RPM as said crankshaft but in the opposite direction to that of the crankshaft.

5. The combination specified in claim 4 wherein said reciprocable members are located above said crankshaft, and wherein said second and third gears are also located above said crankshaft, and wherein said sixth and seventh gears are also located above said crankshaft, and wherein said first to fourth gears are located near one axial end of the crankshaft and said fifth to eighth gears are located near the opposite axial end of the crankshaft, and wherein one said contraweight is located near one axial end of the crankshaft and the second said contraweight is located near the opposite axial end of the crankshaft.

6. The combination specified in claim 4 wherein said gears are proportioned in diameters such that said second and third and sixth and seventh gears rotate at twice the RPM of said crankshaft, and wherein a secondary balance weight is attached to each of said second and third and sixth and seventh gears and rotate therewith, and wherein said secondary balance weights serve to balance the secondary reciprocating inertia forces of said reciprocable members.

7. The combination specified in claim 3 wherein said reciprocating machine is further defined as having at least three reciprocable members and at least three cranks, one of said contraweights being mounted near one end of said crankshaft and the other said contraweight being mounted near the other end of said crankshaft with all three of said cranks being located between the two said contraweights, and wherein the said two contraweights in cooperation with said main counterweights serve to counterbalance the primary reciprocating inertia forces of all three of said reciprocable members.

8. In a reciprocating machine, the combination of a frame structure, a crankshaft mounted for rotation in the frame structure, said crankshaft having at least two cranks angularly disposed relative to each other about the axis of the crankshaft, at least two pistons guided for reciprocation relative to said frame structure, a connecting rod interconnecting each said piston with a respective said crank for respective reciprocation and rotary motion, main counterweights fastened to said crankshaft and rotatable therewith, two contraweights mounted for rotation around the axis of said crankshaft, positive tooth driving means for driving said contraweights at the same RPM as the crankshaft and in the opposite direction of rotation to that of the crankshaft.

said two contraweights being angularly disposed relative to each other about the axis of the crankshaft, said two contraweights being mounted (along the axis of the crankshaft) on opposite sides of said two cranks with the two cranks located between the two said contraweights, and wherein the improvement comprises that said two contraweights in cooperation with said main counterweights serve to counterbalance the primary reciprocating inertia forces of at least two said pistons, and wherein the improvement also comprises that the moments (weight multiplied by radius arm) of the two said contraweights comply substantially with a following method of determination (a) to (i):

(a) Rotate said crankshaft such that the first piston (61) and its respective crank (55) are at the top dead center position, (b) Adjust the static moment of said main counterweights such that they counterbalance all of the rotating portions of said cranks plus the large ends of said con rods, (c) Add additional static moment to said main counterweights such that they counterbalance one half the static moment of the first piston (61) plus one half the static moment of the small end of its respective con rod (58), the static moment of the first piston (61) is the total weight of the first piston (including rings and wrist pin) multiplied by the throw (radius arm) of its respective crank (55), (d) Adjust the static moment of said two contraweights (70 and 71) such that they counterbalance the remaining half of the static moment of said first piston (61) and the small end of its respective con rod (58), the apportionment of the static moment shared by said two contraweights (70 and 71) shall be in inverse proportion to their distances (along the crankshaft) from the centerline of said first piston (61), the vector moments just determined for the two said contraweights (70 and 71) shall be in the radially opposite direction away from said first piston (61), (e) rotate the crankshaft such that the second piston (62) is moved to its top dead center position, at the same time, rotate the two contraweights (70 and 71) the same number of degrees in the opposite direction of rotation to that of the crankshaft, the moment vectors determined in step (d) (for the contraweights) will now be pointed in new directions as just specified, (f) Do the same as step (c) for the main counterweights and for the second piston (62) its respective crankpin (56) and con rod 59, (b) Add additional moments to the two said contraweights (70 and 71) such that they counterbalance the remaining half of the static moment of the second piston (62) and the small end of its respective con rod (59), apportion in the same manner as described in step (d), the vector moments just determined for the two said contraweights (70 and 71) will be in the radially opposite direction away from said second piston (62), (h) determine the vector sum of those (at least two) moment vectors in steps (d) and (g) and this will be the resultant static moment and direction of said first contraweight (70), (i) Do the same as step (h) for the second said contraweight (71), and said steps (a) to (i) determine the correct size and timed angular directions for the various weights so as to obtain primary balance in said machine.

* * * * *